(12) United States Patent
Van Zuijlen et al.

(10) Patent No.: US 8,955,992 B2
(45) Date of Patent: Feb. 17, 2015

(54) MIRROR ADJUSTMENT DEVICE

(75) Inventors: Marinus Jacobus Maria Van Zuijlen, Jaarsveld (NL); Marinus Roose, Nieuwegein (NL)

(73) Assignee: MCi (Mirror Controls International) Netherlands B.V., Woerden (NL)

( * ) Notice: Subject to any disclaimer, the term of this patent is extended or adjusted under 35 U.S.C. 154(b) by 0 days.

(21) Appl. No.: 13/379,874

(22) PCT Filed: Jun. 22, 2010

(86) PCT No.: PCT/NL2010/050383
§ 371 (c)(1),
(2), (4) Date: Mar. 15, 2012

(87) PCT Pub. No.: WO2010/151120
PCT Pub. Date: Dec. 29, 2010

(65) Prior Publication Data
US 2012/0162796 A1 Jun. 28, 2012

(30) Foreign Application Priority Data
Jun. 22, 2009 (NL) .................................. 2003061

(51) Int. Cl.
*G02B 7/18* (2006.01)
*B60R 1/074* (2006.01)
(52) U.S. Cl.
CPC ...................................... *B60R 1/074* (2013.01)
USPC ........................................... 359/841; 359/872
(58) Field of Classification Search
USPC ............................. 359/841, 843, 871, 872, 877
See application file for complete search history.

(56) References Cited

U.S. PATENT DOCUMENTS

| 6,543,902 | B2 * | 4/2003 | Bohm | 359/841 |
| 6,926,414 | B2 * | 8/2005 | Van Stiphout | 359/841 |
| 7,008,067 | B2 * | 3/2006 | Hsu | 359/841 |
| 7,628,499 | B2 * | 12/2009 | Brouwer et al. | 359/877 |

FOREIGN PATENT DOCUMENTS

| EP | 0 931 699 A1 | 2/1999 |
| JP | 10-129349 | 5/1998 |

(Continued)

OTHER PUBLICATIONS

Machine Translation of JP 10-129349 A published May 19, 1998.*

(Continued)

*Primary Examiner* — Frank Font
(74) *Attorney, Agent, or Firm* — Swanson & Bratschun, L.L.C.

(57) ABSTRACT

A mirror adjustment device, in particular for a motor vehicle, comprising a mirror foot for mounting on a motor vehicle and a mirror housing adjustably connected with the mirror foot, wherein the mirror housing is adjustable between a folded-in position in which the mirror housing is situated substantially along the motor vehicle and a folded-out position in which the mirror housing is situated substantially transversely to the motor vehicle. The mirror housing is adjustable between a first position in which a slit is present between neighboring surfaces of the mirror housing and the mirror foot and a second position in which the neighboring surfaces of the mirror housing and the mirror foot substantially abut against each other. The mirror adjustment device comprises an elastic element for biasing the mirror housing towards the first position and is provided with cooperating elements for, under the influence of the elastic element, bringing the mirror housing into the first position when adjusting the mirror housing between the folded-in position and the folded-out position.

14 Claims, 4 Drawing Sheets

(56) References Cited

FOREIGN PATENT DOCUMENTS

| | | |
|---|---|---|
| JP | 2002-293190 | 10/2002 |
| WO | WO 03/033303 A1 | 4/2003 |
| WO | WO 2004/091974 A1 | 10/2004 |

OTHER PUBLICATIONS

International Search Report mailed Aug. 25, 2010 for corresponding International Application No. PCT/NL2010/050383.

\* cited by examiner

MIRROR ADJUSTMENT DEVICE

RELATED APPLICATIONS

This application is a 35 U.S.C. §371 national phase application of PCT/NL2010/050383 (WO 2010/151120), filed on Jun. 22, 2010, entitled "Mirror Adjustment Device", which application claims priority to Netherlands Application No. 2003061, filed Jun. 22, 2009, which is incorporated herein by reference in its entirety.

The invention relates to a mirror adjustment device, in particular for a motor vehicle, comprising a mirror foot for mounting on a motor vehicle and a mirror housing adjustably connected with the mirror foot, wherein the mirror housing is adjustable between a folded-in position in which the mirror housing is situated substantially along the motor vehicle and a folded-out position in which the mirror housing is situated substantially transversely to the motor vehicle. The mirror foot is usually surrounded by a mirror base and the mirror housing is usually surrounded by a mirror cap.

Such a mirror adjustment device is generally known and is widely used in, for example, outside mirrors of motor vehicles. The mirror housing can thus be adjusted between the folded-in position, in which the mirror housing is situated substantially along the motor vehicle, for instance in a parking position of the vehicle, and a folded-out position, in which the mirror housing is situated substantially transversely to the motor vehicle and projects from the motor vehicle relatively far, for instance while the motor vehicle is being driven. Thus, damage to the outside mirror can be prevented. Since the mirror cap surrounds the mirror housing and the mirror base surrounds the mirror foot, during adjustment of the mirror housing relative to the mirror foot, also the mirror cap is adjusted relative to the mirror base. For the sake of manufacturing tolerances and/or to enable adjustment of the mirror cap relative to the mirror base, there is usually a space between the mirror cap and the mirror base. This space may be, for example, in the magnitude order of 0.5-1 mm. Disadvantages of such a space are that it can get soiled and/or that it can cause noise, for instance of wind rustling, during driving of the motor vehicle and/or that the mirror cap may start to vibrate or rattle with respect to the mirror base.

To prevent these problems, it is known to provide the mirror adjustment device with, for example, a sealing to fill up the space between the mirror base and the mirror cap. The sealing may be, for example, a mat sealing having an open foam structure. However, such a sealing may get damaged, so that noise, soiling and/or vibrations can occur again.

An object of the invention is to provide a mirror adjustment device that prevents at least one of the above-mentioned disadvantages.

To this end, the invention provides a mirror adjustment device, in particular for a motor vehicle, comprising a mirror foot for mounting on a motor vehicle and a mirror housing adjustably connected with the mirror foot, wherein the mirror housing is adjustable between a folded-in position in which the mirror housing is situated substantially along the motor vehicle and a folded-out position in which the mirror housing is situated substantially transversely to the motor vehicle, wherein the mirror housing furthermore is adjustable between a first position and a second position, wherein in the first position the distance between neighboring surfaces of the mirror housing and the mirror foot is greater than the distance between the neighboring surfaces of the mirror housing and the mirror foot in the second position, wherein the mirror adjustment device furthermore comprises an elastic element for biasing the mirror housing towards the first position and wherein the mirror adjustment device is provided with cooperating elements for, under the influence of the elastic element, bringing the mirror housing into the first position when adjusting the mirror housing between the folded-in position and the folded-out position.

As the distance between neighboring surfaces of the mirror housing and the mirror foot in the first position is greater than the distance between the neighboring surfaces of the mirror housing and the mirror foot in the second position, there is in the first position a slit between the neighboring surfaces of the mirror housing and the mirror foot. In the second position the distance between the neighboring surfaces of the mirror housing and the mirror foot is smaller and the slit can be substantially closed and/or the neighboring surfaces of the mirror housing and the mirror foot can substantially abut against each other.

By the provision of an elastic element that biases the mirror housing towards the first position and cooperating elements with which the mirror housing can be brought into the first position, relatively simply the slit can be realized between the mirror housing and the mirror foot, so that adjustment between the folded-in position and the folded-out position can take place relatively smoothly.

By furthermore designing the cooperating elements such that at the end of an adjustment path between the folded-in position and the folded-out position the mirror housing can be brought to the second position, in a relatively simple manner the distance between the neighboring surfaces of the mirror housing and the mirror foot can be reduced, so that the slit between the mirror housing and the mirror foot can, for example, be substantially closed in the folded-out position, so that accumulation of dirt, vibrating or noise can be reduced and/or obviated.

By designing the mirror adjustment device according to the invention, the gap between the mirror cap and the mirror base will be greater during adjustment between the folded-in position and the folded-out position than when the mirror cap is in the folded-in position and/or the folded-out position. As a result, for example, damage to the mat sealing between the mirror cap and the mirror base during adjustment can be reduced.

As the cooperating elements and/or the mirror housing in the first position are pressed against the drive gearwheel under the influence of the elastic element, friction can arise between the mirror housing and/or the cooperating elements and the drive gearwheel. By counter-friction adjustment of the mirror housing between the folded-in position and the folded-out position, vibrating or rattling of the mirror housing during adjustment can be obviated and in a relatively stable manner the mirror housing can be adjusted between the folded-in position and the folded-out position.

As the cooperating elements comprise a ring being rotation-locked with the mirror foot, in a simple manner, via opposite sides of the ring a cooperation between the drive gearwheel on the one hand and the mirror housing on the other can be achieved. By providing the rotation-locked ring and the drive gearwheel with cooperating projections or run-on surfaces, in a simple manner rotation of the drive gearwheel with respect to the rotation-locked ring can be effected, for example, run-on surfaces of the ring can run on against run-on surfaces of the drive gearwheel so that, for example, energization of the mirror housing towards the first position or towards the second position can be achieved.

The mirror adjustment device may be provided with a main spring which engages the drive gearwheel and presses the drive gearwheel onto the mirror foot. For example, the axial direction of the main spring coincides substantially with the axial direction of the mirror foot and the main spring presses on the mirror foot in axial direction. The mirror housing is usually situated in the space between the mirror foot and the drive gearwheel. Advantageously, the cooperating elements between the mirror housing and the drive gearwheel are so configured that in the first position the mirror housing is free from the influence of the main spring. In the first position the mirror housing only experiences the bias of the elastic element, so that a slit can form between the mirror housing and the mirror foot. Also, the elastic element can be made of relatively light design, because it only needs to energize the mirror housing and is independent of the main spring.

By designing the cooperating elements such that in the second position the mirror housing is pressed against the mirror foot by the main spring against the bias of the elastic element, the mirror housing can be energized towards the second position independently of the main spring but determined solely by the configuration of cooperating elements and/or the cooperating projections and/or cooperating run-on surfaces. The force of the main spring can be transferred via the cooperating elements to the mirror housing and is sufficiently large to overcome the bias of the elastic element. Preferably, the mirror housing at the end of an adjustment path between folded-in position and folded-out position is energized towards the second position, for example in that a run-on surface of the rotation-locked ring runs against a run-on surface of the drive gearwheel and thus a coupling can be effected between the mirror housing and the drive gearwheel along which the force of the main spring can be transferred to the mirror housing.

As the elastic element energizes the mirror housing independently of the main spring, the elastic element can be made of relatively light and inexpensive design. For example, the elastic element may be designed as an auxiliary spring, or as a ring-shaped spring element.

By including the elastic element between the mirror foot and the mirror housing, the bias of the elastic element towards the mirror housing works opposite to the force of, for example, the main spring.

Further advantageous embodiments are represented in the subclaims.

The invention will be elucidated on the basis of an exemplary embodiment which is represented in a drawing. In the drawing.

Figure 1:
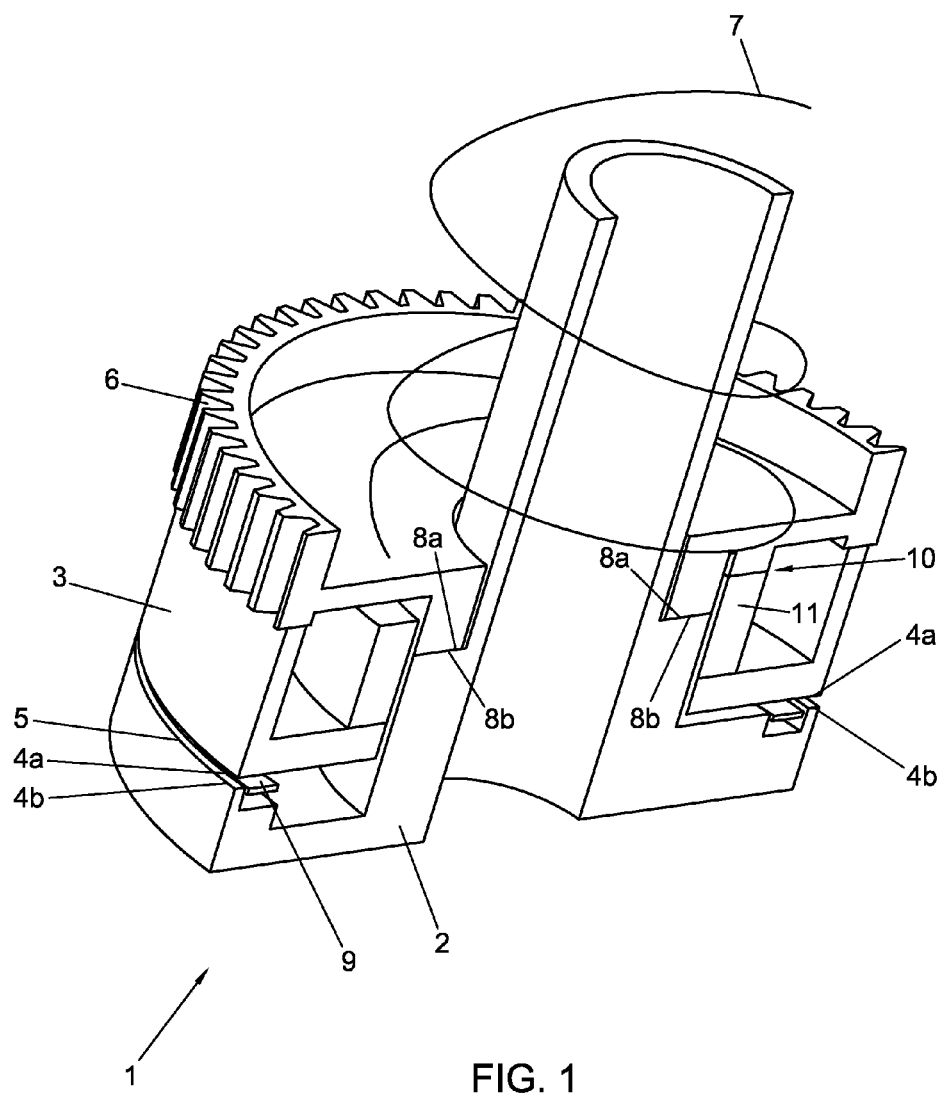
FIG. 1 shows a perspective cross section of a mirror adjustment device according to the invention in the first position.

It is noted that the figures are only schematic representations of a preferred embodiment of the invention that is described by way of non-limiting exemplary embodiment. In the figures, equal or corresponding parts are represented with the same reference numerals. For the sake of simplicity, the mirror cap surrounding the mirror housing and the mirror base surrounding the mirror foot are not represented.

FIG. 1 shows a mirror adjustment device 1 according to the invention. The mirror adjustment device 1 comprises a mirror foot 2 and a mirror housing 3 which is adjustably connected with the mirror foot 2. The mirror housing 3 can translate and rotate relative to the mirror foot 2. Via the mirror foot 2 the mirror adjustment device 1 is usually mounted on a motor vehicle, for example as an outside mirror unit of a motor vehicle. The outside mirror unit of the motor vehicle usually comprises also a mirror cap that surrounds the mirror housing, and a mirror base that surrounds the mirror foot. Between the mirror cap and the mirror base there is usually a space, for example, to enable adjustment of the mirror cap relative to the mirror base.

The mirror housing 3 is adjustable between a folded-in position in which the mirror housing 3 is situated substantially along the motor vehicle and a folded-out position in which the mirror housing 3 is situated substantially transversely to the motor vehicle. In adjusting the mirror housing 3, the mirror cap moves along with it.

The mirror housing 3 is furthermore adjustable relative to the mirror foot 2 between a first position and a second position, where in the first position the distance between neighboring surfaces 4a, 4b of the mirror housing 3 and the mirror foot 2 is greater than the distance between the neighboring surfaces 4a, 4b of the mirror housing 3 and the mirror foot 2 in the second position.

Figure 2:
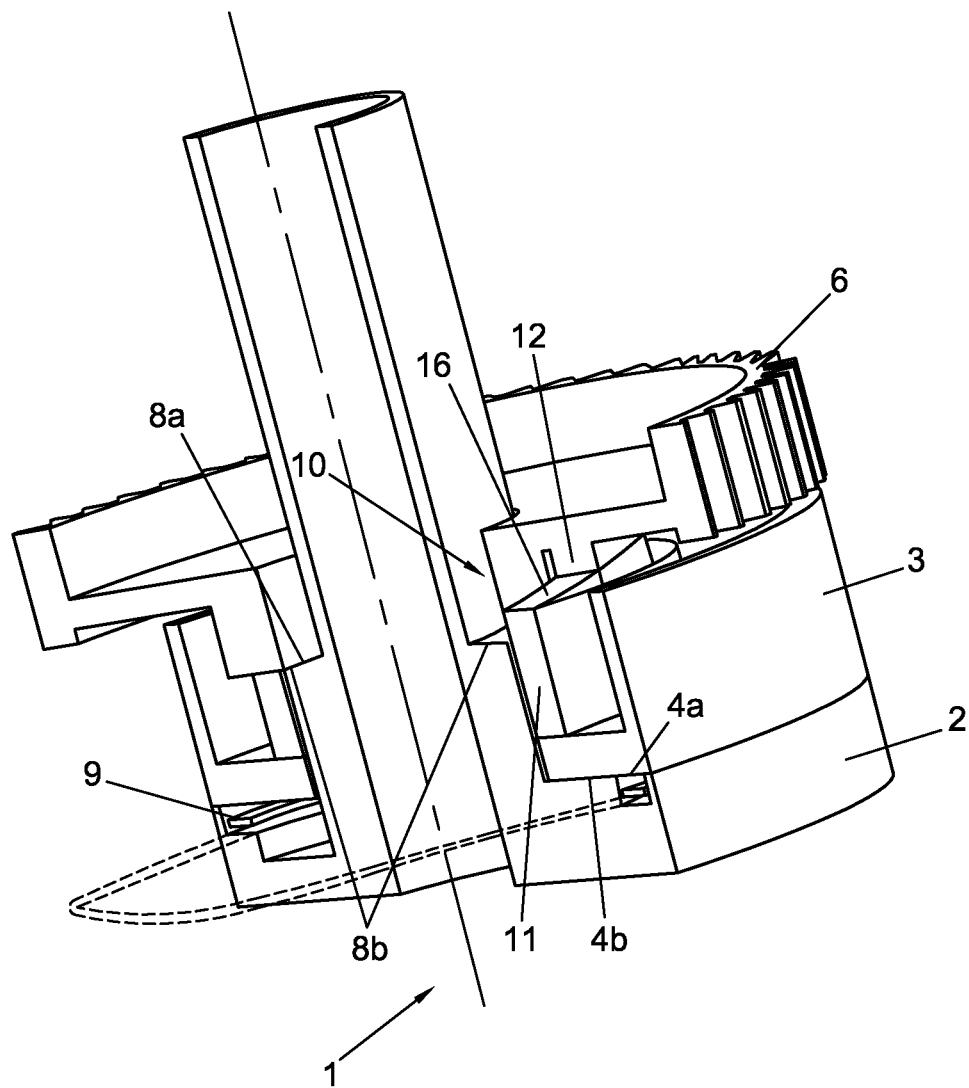
FIG. 2 shows a perspective cross section of a mirror adjustment device according to the invention in the second position.
Figure 3:
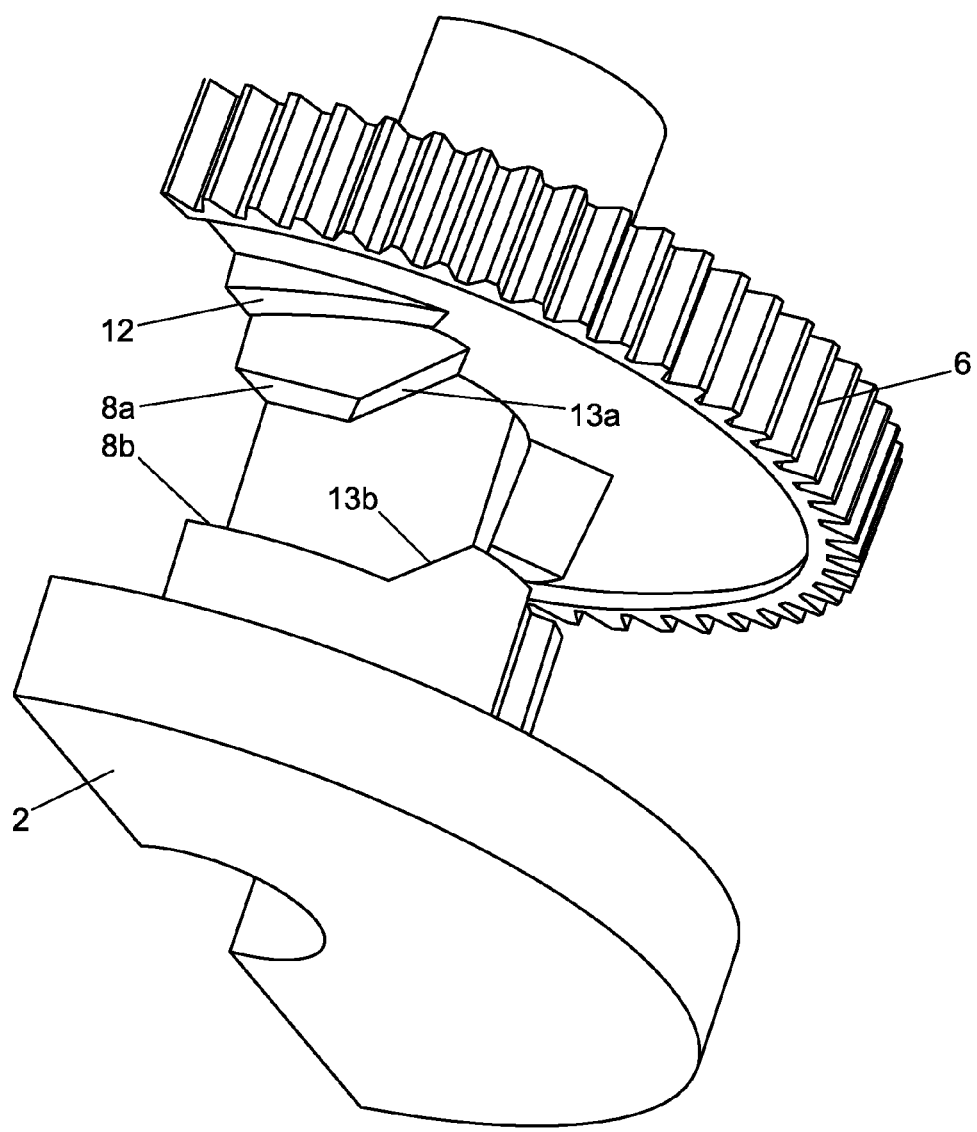
FIG. 3 shows an exploded perspective view of the drive gearwheel around the mirror foot of a mirror adjustment device according to the invention.

In FIG. 1 it is shown that between neighboring surfaces 4a, 4b of the mirror housing 3 and the mirror foot 2, respectively, there is a slit 5. In FIG. 2 the mirror housing 3 is shown in the second position, where the distance between the neighboring surfaces 4a and 4b is less than in the first position of FIG. 1 and the neighboring surfaces 4a and 4b substantially abut against each other. In the second position there is practically no slit between the mirror housing 3 and the mirror foot 2. In this exemplary embodiment, the mirror housing 3 is adjustable relative to the mirror foot 2 between the first position and the second position in axial direction of the mirror foot 2.

The mirror adjustment device 1 is provided with a drive gearwheel 6 of a drive unit, enabling driven adjustment of the mirror housing 3 between the folded-in position and the folded-out position. Bearing on the drive gearwheel 6 is usually a main spring 7, which presses the drive gearwheel 6 via the surfaces 8a, 8b onto the mirror foot 2.

Situated between the mirror housing 3 and the mirror foot 2 in this exemplary embodiment is an elastic element 9 designed as a ring-shaped spring element. The ring-shaped spring 9 is designed to bias the mirror housing 3 towards the first position. In this exemplary embodiment, this means that the ring-shaped spring 9 tends to push the mirror housing 3 upwards. Possibly, the elastic element 9 may also be designed as a spiral spring which, for example, may be mounted between the mirror housing 3 and the drive gearwheel 6 to bias the mirror housing 3 to the first position. Here, however, in a simple manner, a spring 9 of ring-shaped bent configuration is provided, as can be seen, for example, in FIG. 4.

Figure 4:
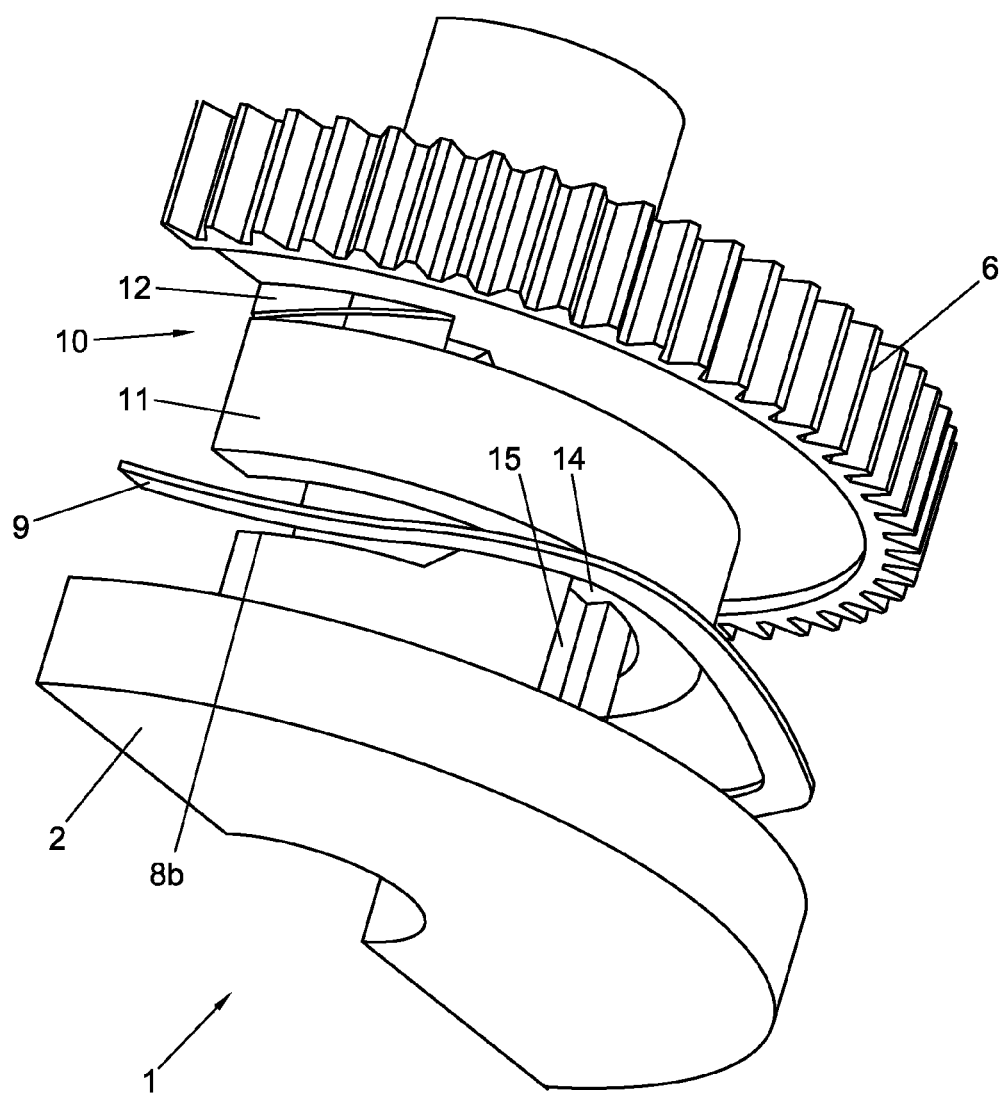
FIG. 4 shows an exploded perspective view of a mirror adjustment device according to the invention.

The mirror adjustment device 1 is furthermore provided with cooperating elements 10 for bringing, under the influence of the ring-shaped spring 9, the mirror housing 3 in the first position when adjusting the mirror housing 3 between the folded-in position and the folded-out position. The cooperating elements 10 comprise in this exemplary embodiment the ring 11 and a run-on surface 12 on the drive gearwheel 6. Via the cooperating elements 10 and the ring-shaped spring 9 the mirror housing 3 can be adjusted between the first position and the second position independently of the main spring 7. The ring 11 is restrained from rotation with respect to the mirror foot 2, as shown in FIG. 4. Via the rib 14 which engages in the groove 15, the ring 11 can only translate in axial direction of the mirror foot 2 and the ring 11 is thus rotation-locked with respect to the mirror foot 2.

In the second position of the mirror housing 3, a run-on surface 16 of the ring 11 cooperates with the run-on surface 12 of the drive gearwheel 6. As a result, the distance between the drive gearwheel 6 and the mirror housing 3 is enlarged, as a result of which the ring 11 is, as it were, clamped between the drive gearwheel 6 and the mirror housing 3. The force of the main spring 7 can be transferred via the drive gearwheel 6 and the ring 11 onto the mirror housing 3, so that the mirror housing 3 is pressed down, against the bias of the ring-shaped spring 9, until the neighboring surfaces 4a and 4b abut. As the neighboring surfaces 4a and 4b abut, the slit 5 will substantially disappear in the second position, as a result of which the generation of vibrations and/or noise, for example in the folded-out position of the mirror housing 3, can be reduced.

In the first position the run-on surfaces 12 and 16 of the drive gearwheel 6 and the ring 11, respectively, do not cooperate and the ring 11 with the mirror housing 3 can be pushed upwards by the bias of the ring-shaped spring 9. The force of the main spring 7 is transferred along the surfaces 8a and 8b via the drive gearwheel 6 to the mirror foot 2, as a result of which the mirror housing 3 in the first position is free from the influence of the main spring 7. Both in the first position and in the second position, the force that the main spring 7 exerts on the drive gearwheel 6 remains unchanged. Thus, independently of the main spring 7, by the cooperating elements 10 and the ring-shaped spring 9, the mirror housing 3 can be brought into the first position or the second position.

In the first position the mirror housing 3 is pushed against the drive gearwheel 6 by the ring-shaped spring 9, so that during adjustment between the folded-in position and the folded-out position friction arises between the drive gearwheel 6 and the mirror housing 3. As a result, during adjustment, the mirror housing 3 becoming unstable or starting to vibrate or rattle can be prevented. By adjusting against the friction, a relatively stable adjustment of the mirror housing 3 can be achieved.

When adjusting the mirror housing 3 between the folded-in position and the folded-out position, the surfaces 8a and 8b of the drive gearwheel 6 and the mirror foot 2, respectively, move over each other up to the run-on surfaces 13a and 13b which indicate the end of the adjustment path. During adjustment the mirror housing 3 is in the first position, with the ring-shaped spring 9 pushing the mirror housing 3 and the ring 11 upwards and a slit 5 being present between the mirror housing 3 and the mirror foot 2. When the run-on surface 13a runs against run-on surface 13b, also the run-on surface 16 of the ring 11 runs against the run-on surface 12 of the drive gearwheel 6, so that the ring 11 is, as it were, pressed between the mirror housing 3 and the drive gearwheel 6. As a result, a coupling is effected between the drive gearwheel 6 and the mirror housing 3 along which the force of the main spring 7 can be transferred to the mirror housing 3 to thereby press the mirror housing 3 downwards, against the bias of the spring 9, towards the second position and substantially close the slit 5. At the end of the adjustment path between the folded-in position and the folded-out position, the mirror housing 3 is, as it were, automatically, through cooperation of the cooperating elements 10, in particular through cooperation of the run-on surfaces 11 and 16, brought from the first position to the second position, independently of the main spring 7.

Upon reverse adjustment, the cooperation between the run-on surfaces 11 and 16 is undone, so that the ring 11 and the mirror housing 3 can be pushed upwards to the first position again by the ring-shaped spring 9.

The invention is not limited to the exemplary embodiment represented here. Many variants are possible. Thus, the displacement of the mirror housing with respect to the mirror foot between the first and the second position may be carried out, for example, in transversal direction with respect to the mirror foot and/or in a combination of an axial and transversal direction. Such variants are understood to be within the scope of the invention as represented in the following claims.

The invention claimed is:

1. A mirror adjustment device, in particular for a motor vehicle, comprising a mirror foot for mounting on a motor vehicle and a mirror housing adjustably connected with the mirror foot, wherein the mirror housing is adjustable between a folded-in position in which the mirror housing is situated substantially along the motor vehicle and a folded-out position in which the mirror housing is situated substantially transversely to the motor vehicle, wherein the mirror housing furthermore is adjustable between a first position and a second position, wherein in the first position a distance between neighboring surfaces of the mirror housing and the mirror foot is greater than the distance between the neighboring surfaces of the mirror housing and the mirror foot in the second position, wherein the mirror adjustment device furthermore comprises an elastic element for biasing the mirror housing towards the first position and wherein the mirror adjustment device is provided with cooperating elements for, under the influence of the elastic element, bringing the mirror housing into the first position when adjusting the mirror housing between the folded-in position and the folded-out position, wherein the elastic element continues to bias the mirror housing towards the first position while in the second position.

2. The mirror adjustment device according to claim 1, wherein the cooperating elements are designed to bring the mirror housing at the end of an adjustment path between the folded-in position and the folded-out position to the second position.

3. The mirror adjustment device according to claim 1, wherein the cooperating elements are designed for cooperation between the mirror housing and a drive gearwheel of a drive unit for adjusting the mirror housing between the folded-in position and the folded-out position.

4. The mirror adjustment device according to claim 3, wherein at least one of the cooperating elements and the mirror housing in the first position are pressed against the drive gearwheel under the influence of the elastic element.

5. The mirror adjustment device according to claim 3, wherein the cooperating elements comprise a ring being rotation-locked with the mirror foot, which is provided with opposite sides for cooperation with the drive gearwheel on one side and the mirror housing on the other side.

6. The mirror adjustment device according to claim 5, wherein the rotation-locked ring and the drive gearwheel are provided with at least one of cooperating projections and run-on surfaces.

7. The mirror adjustment device according to claim 3, furthermore comprising a main spring for pressing the drive gearwheel onto the mirror foot.

8. The mirror adjustment device according to claim 7, wherein the mirror housing in the first position is free from the influence of the main spring.

9. The mirror adjustment device according to claim 7, wherein the neighboring surfaces of the mirror housing and the mirror foot in the second position are pressed against each other under the influence of the main spring, against the bias of the elastic element.

10. The mirror adjustment device according to claim 1, wherein the elastic element is an auxiliary spring.

11. The mirror adjustment device according to claim 1, wherein the elastic element is receivable between the mirror foot and the mirror housing.

12. The mirror adjustment device according to claim 1, wherein the elastic element is a ring-shaped spring element.

13. The mirror adjustment device according to claim 1, wherein the mirror housing is adjustable between the first position and the second position in axial direction of the mirror foot.

14. A mirror adjustment device, in particular for a motor vehicle, comprising a mirror foot for mounting on a motor vehicle and a mirror housing adjustably connected with the mirror foot, wherein the mirror housing is adjustable between a folded-in position in which the mirror housing is situated substantially along the motor vehicle and a folded-out position in which the mirror housing is situated substantially transversely to the motor vehicle, wherein the mirror housing furthermore is adjustable between a first position and a second position, wherein in the first position the distance between neighboring surfaces of the mirror housing and the mirror foot is greater than the distance between the neighboring surfaces of the mirror housing and the mirror foot in the second position, wherein the mirror adjustment device furthermore comprises an elastic element for biasing the mirror housing towards the first position and wherein the mirror adjustment device is provided with cooperating elements for, under the influence of the elastic element, bringing the mirror housing into the first position when adjusting the mirror housing between the folded-in position and the folded-out position, furthermore comprising a main spring for pressing the drive gearwheel onto the mirror foot, and wherein the mirror housing in the first position is free from the influence of the main spring.

\* \* \* \* \*